United States Patent
Pruvot

(10) Patent No.: US 8,423,091 B2
(45) Date of Patent: Apr. 16, 2013

(54) MOBILE TELEPHONE

(75) Inventor: Thomas Pruvot, Paris (FR)

(73) Assignee: Celsius X VI II, Paris (FR)

( * ) Notice: Subject to any disclaimer, the term of this patent is extended or adjusted under 35 U.S.C. 154(b) by 55 days.

(21) Appl. No.: 13/133,676

(22) PCT Filed: Dec. 9, 2009

(86) PCT No.: PCT/IB2009/007679
§ 371 (c)(1),
(2), (4) Date: Jun. 9, 2011

(87) PCT Pub. No.: WO2010/070408
PCT Pub. Date: Jun. 24, 2010

(65) Prior Publication Data
US 2011/0244926 A1    Oct. 6, 2011

(30) Foreign Application Priority Data
Dec. 19, 2008    (EP) ..................................... 08291218

(51) Int. Cl.
*H04M 1/00* (2006.01)
(52) U.S. Cl.
USPC ............... 455/567; 455/90.3; 379/373.01; 379/374.01
(58) Field of Classification Search ............ 455/567, 455/90.3; 379/373.01, 374.01, 374.03
See application file for complete search history.

(56) References Cited

U.S. PATENT DOCUMENTS

| 3,029,593 | A | | 4/1962 | Gerace | |
|---|---|---|---|---|---|
| 3,259,059 | A | * | 7/1966 | Doersam, Jr. | 101/93.29 |
| 5,172,092 | A | * | 12/1992 | Nguyen et al. | 340/7.58 |
| 5,524,061 | A | * | 6/1996 | Mooney et al. | 381/151 |
| 5,894,263 | A | * | 4/1999 | Shimakawa et al. | 340/388.1 |
| 6,009,167 | A | | 12/1999 | Chiang | |
| 6,215,391 | B1 | * | 4/2001 | Murray et al. | 340/388.1 |
| 7,880,592 | B2 | * | 2/2011 | Kaneda et al. | 340/388.1 |
| 8,159,905 | B2 | * | 4/2012 | Andre et al. | 368/13 |
| 2007/0125636 | A1 | | 6/2007 | Karan et al. | |

FOREIGN PATENT DOCUMENTS

| EP | 0 506 179 A1 | 9/1992 |
|---|---|---|
| WO | 2009/044027 A2 | 4/2009 |

OTHER PUBLICATIONS

"The Museum of Technology, the Great War and WWII", Internet Article, @2007.*
International Search Report, dated Feb. 10, 2010, from corresponding PCT application.

* cited by examiner

*Primary Examiner* — Duc M Nguyen
(74) *Attorney, Agent, or Firm* — Young & Thompson

(57) ABSTRACT

A portable telephone is characterized in that it includes a ringing mechanism (1) including at least one sound element (10) and at least one actuator member (8) able to come into mechanical contact with the sound element (10) so as to make it produce a sound, and electronic elements of control of the ringing mechanism.

17 Claims, 7 Drawing Sheets

MOBILE TELEPHONE

The present invention relates to a mobile telephone.

BACKGROUND OF THE INVENTION

1. Field of the Invention

"Mobile telephone" is understood to mean any object having a mobile telephony function, such as a mobile telephone itself or a personal digital assistant (PDA).

2. Description of the Related Art

Mobile telephones are used by a large proportion of the population and are provided with numerous functionalities. For many years, progress in the miniaturisation of electronic components has allowed the inclusion of a camera, MP3 player, GPS or compact keypad allowing messages to be typed and the Internet to be accessed.

As for other electronic devices, owners of mobile telephones are more and more often looking for aesthetic and functional features which suit them. There is thus a tendency among users to want to personalise and customise their mobile telephone by choosing different ring-tones, wallpapers, functionality, colour or design.

BRIEF SUMMARY OF THE INVENTION

The present invention aims to propose a mobile telephone which is surprising and attractive in nature.

To this end, there is provided a mobile telephone, characterised in that it comprises:
- a ringing mechanism comprising at least one sounding element and at least one actuating member which is able to come into mechanical contact with the sounding element to cause it to vibrate and to thereby produce a sound, and
- electronic means for controlling the ringing mechanism.

Therefore, the mobile telephone in accordance with the invention includes a ringing mechanical device or mechanism which can be triggered in particular by an incoming telephone call, the reception of a message or by an alarm function of the telephone. The mobile telephone in accordance with the invention can also comprise a traditional ringing device, with loud-speakers, and can allow the user to choose between one of the two ringing options.

Such a ringing mechanism imparts an unexpected, attractive, even ludic character to the mobile telephone both in terms of sound (mechanical ringing produces a different sound than that of loud-speaker ringing) and in terms of aesthetics and appearance (the ringing mechanism can be made visible through a glass on the mobile telephone).

Particular embodiments of the invention are defined in the attached dependent Claims.

BRIEF DESCRIPTION OF THE DRAWINGS

Other features and advantages of the invention will become clear upon reading the following detailed description with reference to the accompanying schematic drawings, in which.

DETAILED DESCRIPTION OF THE PREFERRED EMBODIMENTS

Different embodiments of a mobile telephone including a mechanical ringing device or mechanism controlled by the electronic part of the telephone are described hereinafter.

Figure 1:
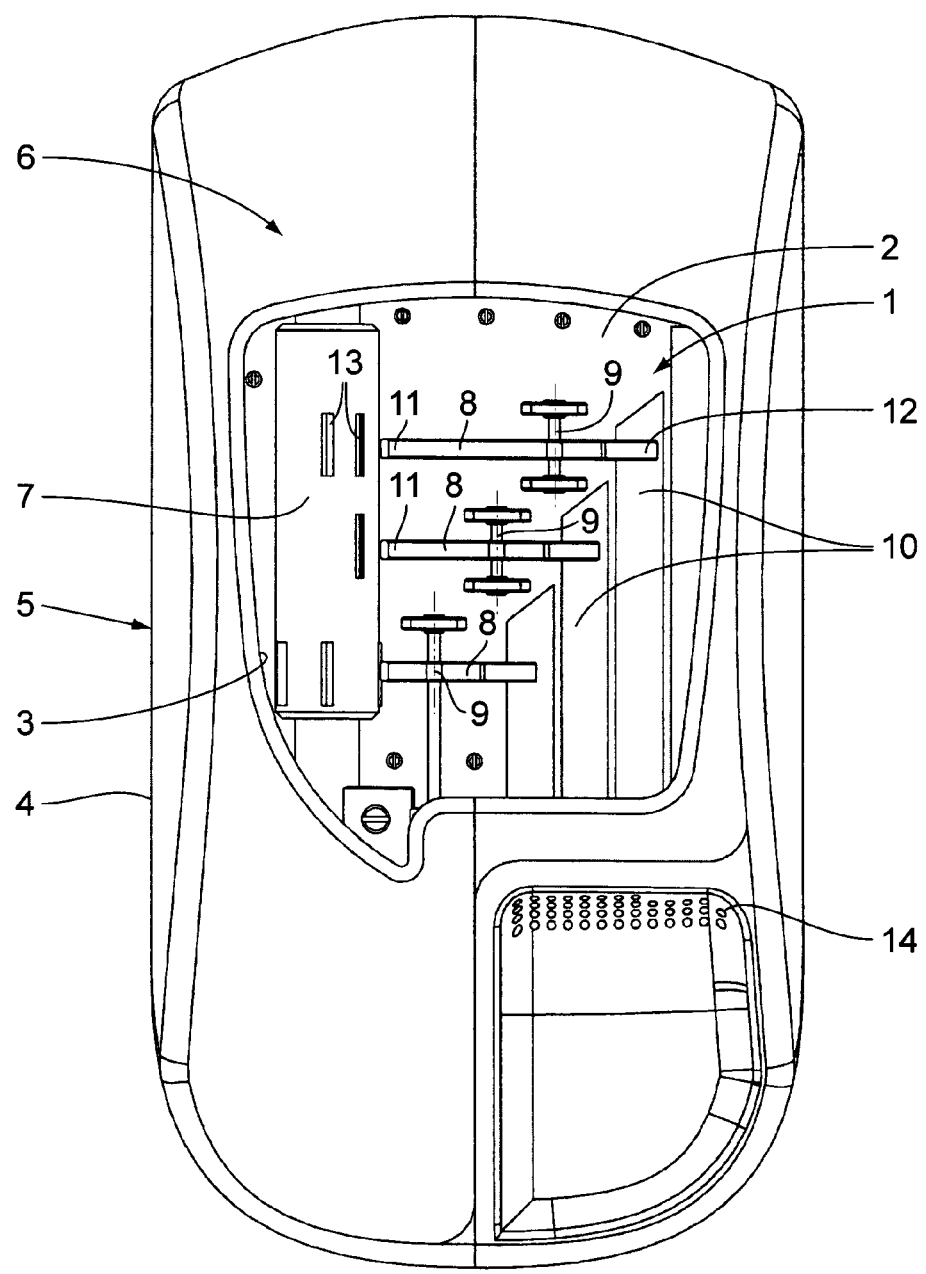
FIG. 1 is a plan view of a mobile telephone with a mechanical ringing device in the closed position in accordance with a first embodiment of the invention.
Figure 2:
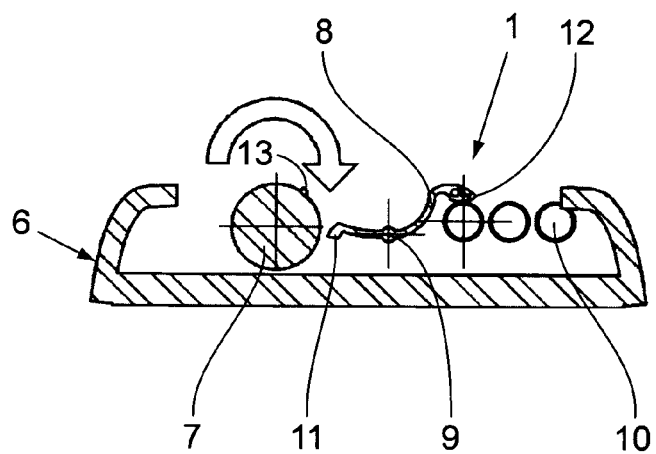
FIG. 2 is a sectional view showing part of the ringing mechanism of the mobile telephone in accordance with the first embodiment.

With reference to FIGS. 1 and 2, a mobile telephone in accordance with a first embodiment of the invention comprises, in addition to a traditional loud-speaker ringing device (not shown), a ringing mechanism 1. This mechanism 1 can be completely or partially visible through a glass 2 which closes an opening 3 formed in the casing 4 of the telephone. In the example shown, the telephone is a folding telephone, i.e., it is formed of two articulated parts 5, 6 which can be folded one on the other, the ringing mechanism 1 is formed in the part 6 of these two parts which has the screen, and the glass 2 is mounted in the outer surface of this part 6 opposite the screen such that the mechanism 1 is visible even when the two parts 5, 6 are folded together. However, as an alternative, the ringing mechanism 1 could be placed in the other part 5 of the telephone. In other alternatives, the mobile telephone in accordance with the invention could be in two parts sliding with respect to each other, or could be monoblock.

The ringing mechanism 1 comprises a cylinder 7 which is rotatable about its axis, hammers 8 mounted so as to pivot about respective axes 9 and extending perpendicularly to the axis of the cylinder 7, and tubes 10 respectively associated with the hammers 8. Each hammer 8 comprises a first end 11 close to the surface of the cylinder 7 and a second end 12 close to the respective tube 10. Each hammer 8 is subjected to the action of a return spring (not shown) which keeps it in a neutral position where the first end 11 does not touch the cylinder 7 and the second end 12 does not touch the respective tube 10. The tubes 10 have different lengths so that when struck they produce different musical notes by their vibration. The cylinder 7 has protrusions 13 on its surface. When the cylinder 7 rotates and a given protrusion 13 reaches a corresponding hammer 8, the protrusion 13 contacts the first end 11 of the hammer 8 and bears against it which causes the hammer 8 to pivot against the action of its return spring. During this pivoting movement, the second end 12 of the hammer 8 is raised, i.e., it moves away from the respective tube 10. Once the protrusion 13 has passed the first end 11 and is no longer in contact therewith, the hammer 8 is then subject only to the action of its return spring. The return spring, in relaxing, causes the hammer 8 to pivot sharply in the opposite direction until the end 12 strikes the respective tube 10 thereby producing a musical note, and then returns the hammer 8 to its neutral position which is close to the tube 10 but out of contact therewith so as to allow the tube 10 to resonate. The arrangement of the protrusions 13 on the surface of the cylinder 7 defines the melody which is played by the mechanism 1 when the cylinder 7 is rotationally driven. At one end of the tubes 10, small openings 14 protected by a dust filter are formed in the casing 4 of the telephone so as to allow the produced sound to escape.

In alternative embodiments, the tubes 10 can be replaced by other gongs or sounding elements such as strips, bells or bent wires of the type found in chiming mechanical watches.

Figure 3:
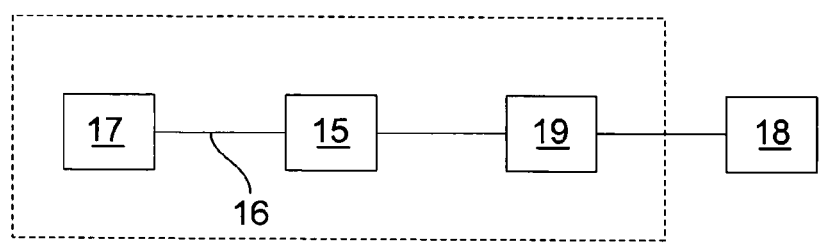
FIG. 3 is a block diagram showing in particular an electronic part controlling this ringing mechanism.

FIG. 3 illustrates the control sequence of the ringing mechanism 1. A microcontroller 15 is connected to the main processor 17 of the telephone, typically by a serial connection 16, such as an I2C, UART or SPI connection. The microcontroller 15 has an output which is connected to a rotating electric motor 18 via an amplification circuit 19. The electric motor 18 is mechanically connected to the cylinder 7 so as to rotationally drive it upon command by the microcontroller 15.

Thus, when a telephone call is received by the telephone, the processor 17 commands the microcontroller 15 to trigger the ringing of the mechanism 1 if the user has previously selected this ringing option as the one to be used by the telephone. The microcontroller 15 then actives the motor 18 which starts to rotationally drive the cylinder 7 to play the melody. Once the user has accepted or refused the call via the keypad and the screen of the telephone, the processor 17 commands the microcontroller 15 to stop the ringing. The microcontroller 15 then deactivates the motor 18. If the user has previously selected the traditional loud-speaker ringing option of the telephone as the one to be used, the processor 17 controls the triggering of this ringing means upon reception of the telephone call and does not involve the microcontroller 15.

In one alternative embodiment, the processor 17 controls the stopping of the ringing of the mechanism 1 and the triggering of the traditional ringing via loud-speak after a predetermined amount of time if the user has still not accepted nor refused the call. This predetermined amount of time can be programmed by the user.

The ringing mechanism 1 can also be used, upon command by the processor 17 via the microcontroller 15, for other functions than that consisting of informing the user of the reception of a telephone call, for example to inform the user of the reception of an SMS message or low battery charge, as an alarm clock ring or to remind the user about an event he has previously programmed in. It is also possible to dedicate the ringing mechanism 1 to one or more functions and to dedicate the traditional ringing device to one or more other functions so that the user can recognise, from the type of ringing he can hear, the type of event triggering the ringing.

Figure 4:
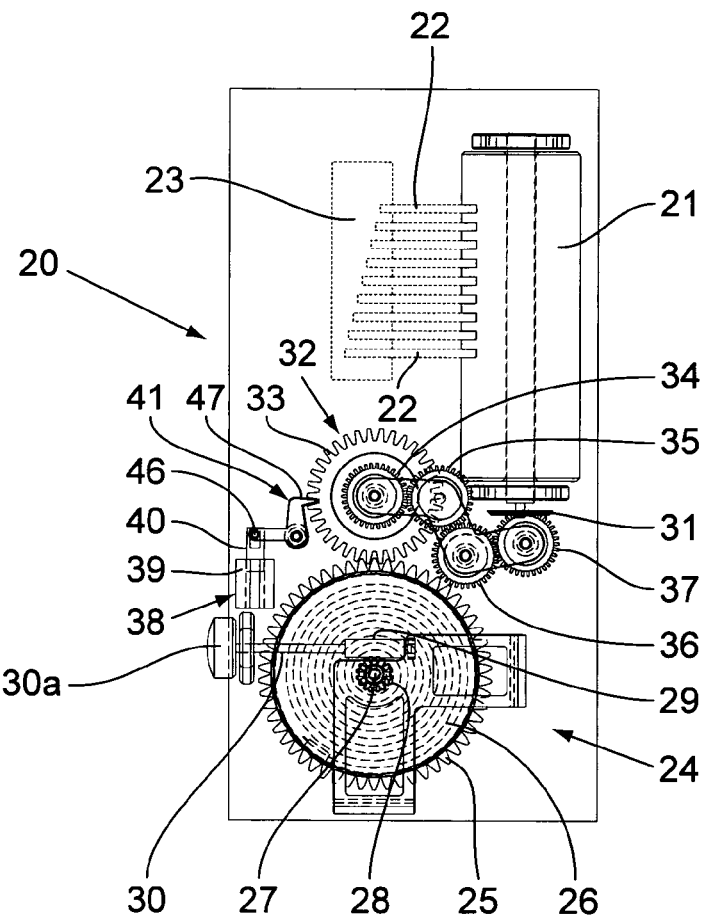
FIG. 4 is a plan view of the ringing mechanism used in a mobile telephone in accordance with a second embodiment of the invention.

A mobile telephone in accordance with a second embodiment of the invention comprises, in addition to a traditional loud-speaker ringing device, a ringing mechanism 20 as illustrated in FIG. 4. As in the first embodiment, the ringing mechanism 20 comprises a rotating cylinder 21 having protrusions (not shown) on its surface, hammers 22 co-operating with the cylinder 21 and sounding elements 23 such as tubes, strips, bells or bent wires which are actuated by the hammers 22. Unlike the first embodiment, the rotating cylinder 21 is not driven by an electric motor but by a mechanical spring motor 24.

The mechanical spring motor 24 comprises, in the manner of the driving member of a mechanical watch, a barrel 25 housing a helical motor spring 26. The barrel 25 is mounted so as to pivot about a shaft 27 to which the inner end of the spring 26 is fixed, the outer end of the spring 26 being fixed to the barrel 25. The shaft 27 is coaxial with and fixedly attached to a ratchet-wheel 28 which engages with a worm thread of a cylindrical part 29 mounted on a winding rod 30. A winding crown 30*a* located at the end of the rod 30 and fixedly attached thereto protrudes to outside the casing of the telephone. Rotation of the crown 30*a* in one direction causes the cylindrical part with a worm thread 29 to rotate and thus causes the shaft 27 to rotate in the direction winding the spring 26. A pawl (not shown) acts on the ratchet-wheel 28 to prevent rotation of the shaft 27 in the other direction. As in traditional watch winding mechanisms, means are provided so that rotation of the crown 30*a* in the direction opposite the stated direction does not rotationally drive the ratchet-wheel 28. These means (not shown) can comprise first and second pinions mounted on the rod 30. The first pinion is freely rotatable about the rod 30 and is fixed in rotation with respect to the cylindrical part with a worm thread 29. The second pinion, called "sliding pinion" is fixed in rotation on the rod 30 but can be translated thereon and is applied against the first pinion by a spring. The first and second pinions have Breguet-type teeth which allow driving of the first pinion by the second pinion only in one direction, i.e., the direction winding the spring 26.

The barrel 25 has peripheral teeth which co-operate with a pinion 31 which is coaxial with and fixedly attached to the cylinder 21 via a gear train 32. When the spring 26 is relieved or allowed to relax, this causes the barrel 25 to rotate and thus rotationally drives the cylinder 21 via the gear train 32 and the pinion 31. In the illustrated example, the gear train 32 comprises a wheel 33 which engages with the barrel 25, a first pinion 34 which is coaxial with and fixedly attached to the wheel 33, a second pinion 35 which engages with the first pinion 34, a third pinion 36 which engages with the second pinion 35 and a fourth pinion 37 which engages with the third pinion 36 and with the pinion 31, forming a bevel gear with the latter.

The spring 26 is wound manually using the crown 30*a*, but the activation and deactivation of the mechanical spring motor 24 are controlled by the electronic part of the telephone. To this end there is used an electromechanical member comprising for example a bistable electromagnet 38 comprising a fixed part or stator 39 and a part 40 which can move in translation in the fixed part 39 and a pivoting blocking piece 41 mechanically linked to the mobile part 40 of the electromagnet 38. The electromagnet 38 is controlled, via an electronic amplification circuit 42, by a microcontroller 43 connected to the main processor 44 of the telephone by a serial connection 45 (cf. FIG. 5). The mobile part 40 of the electromagnet 38 can be in two stable positions in which the electromagnet 38 does not consume energy. The pivoting piece 41 has a first end 46 connected to the mobile part 40 of the electromagnet 38 and a second end 47 forming a finger able to be inserted between two consecutive teeth of the wheel 33. In one of its stable positions, the mobile part 40 keeps the piece 41 in an angular position where the finger 47 is outside the teeth of the wheel 33. In this position, the barrel 25, the gear train 32 and the cylinder 21 rotate under the action of the spring 26 which relaxes, which actuates the hammers 22 and causes them to strike the sounding elements 23 to play the melody defined by the protrusions located on the surface of the cylinder 21. In its other stable position, the mobile part 40 keeps the piece 41 in an angular position where the finger 47 is inserted between two consecutive teeth of the wheel 33. Thus, the barrel 25, the gear train 32 and the cylinder 21 can no longer be rotated. The ringing means is deactivated. As an alternative, the piece 41 could co-operate with another set of teeth than those on the wheel 33 to block or release the barrel 25, the gear train 32 and the cylinder 21, e.g., the teeth of the barrel 25.

It will be noted that the ringing mechanism illustrated in FIG. 4 needs electrical energy only to cause the electromagnet 38 to pass from one stable position to the other. The energy required to cause the mechanism to ring is in fact provided by the spring 26. This embodiment of the invention is therefore economical in terms of electrical energy, in other words it draws less on the battery of the telephone.

The winding crown 30a can be replaced by a ferrule which is fixedly attached to the winding rod 30 and is provided with a recess, e.g., a hexagon socket recess. In this case, the spring 26 is wound using a key adapted to the recess. The winding crown 30a can also comprise such a recess to allow its actuation with or without a key.

In accordance with another feature of the invention, the mobile telephone in accordance with this second embodiment comprises a mechanism allowing the spring 26 to be wound in a manner other than by the manual actuation of the winding crown 30a or of the said ferrule, i.e., by an action constituting use of the telephone. In the international patent application no. PCT/FR2008/051554 by the present Applicant, mechanisms are described which allow a motor spring of a mechanical watch provided in a telephone to be wound by an action constituting use of the telephone, e.g., opening the telephone in the case of a telephone in two mutually hinged or sliding parts, pressing a button, etc. Such winding mechanisms can be used in the present invention to wind the spring 26.

Figure 6:
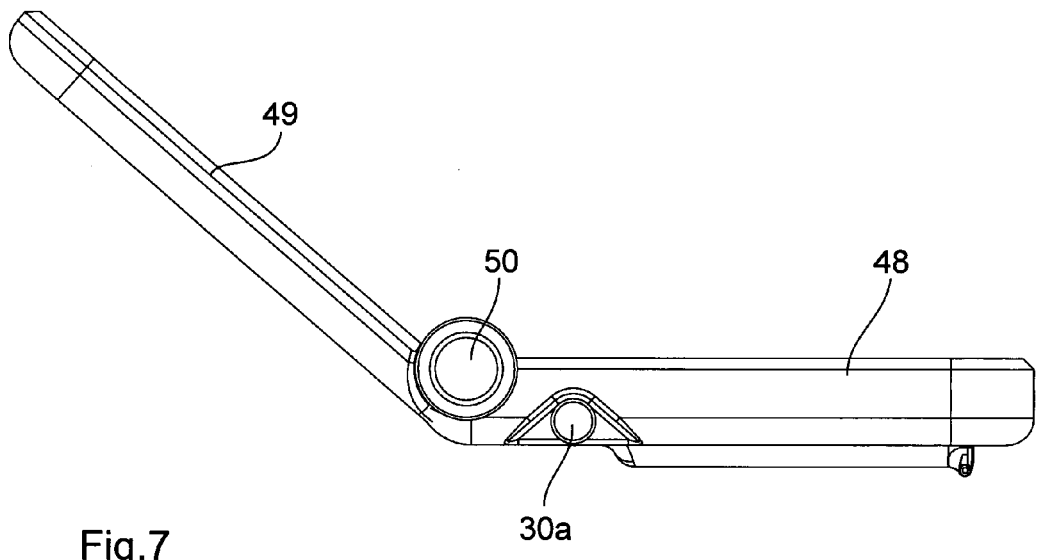
FIG. 6 is a side plan view of the mobile telephone in accordance with the second embodiment of the invention.
Figure 7:
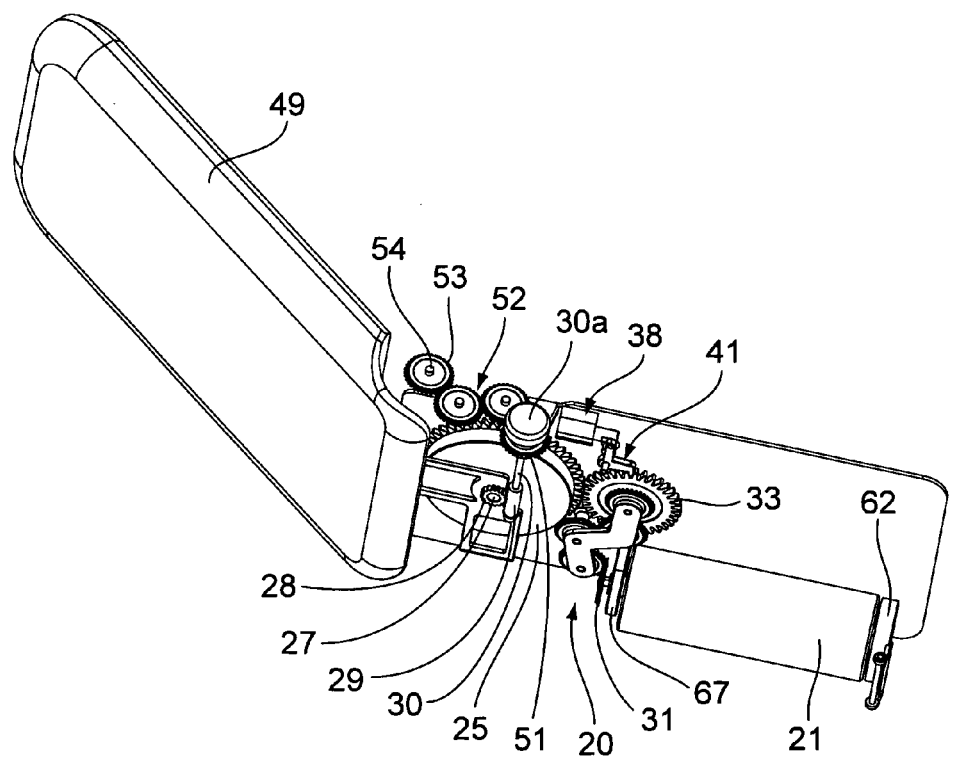
FIG. 7 is a perspective view of the mobile telephone in accordance with the second embodiment of the invention, in which in particular a portion of the casing of the telephone has been removed to show the ringing mechanism and a winding mechanism thereof.

FIGS. 6 and 7 show an example of such a winding mechanism which can be provided in the telephone in accordance with the second embodiment, in the case where this telephone is formed of two parts 48, 49 which are articulated together via a hinge 50. The ringing mechanism 20 is housed in the part 48 comprising the keypad of the telephone. The winding crown 30a protrudes on one of the sides of the part 48, as shown in FIG. 6. A pinion 51 mounted on the winding rod 30 and fixedly attached thereto engages, via a pinion train 52, with a pinion 53 which is coaxial with and fixedly attached to the spindle 54 of the hinge 50, which spindle 54 is fixedly attached to the part 49. Thus, when the user closes the telephone, the pivoting of the part 49 with respect to the part 48 causes the pinion 53 and, via the pinion train 52 and the pinion 51, the winding rod 30 to rotate in the direction winding the spring 26. When the user opens the telephone, the sliding pinion device mounted on the winding rod 30 as described above prevents the rod 30 from driving the ratchet-wheel 28. Of course, the winding direction could be reversed, i.e., provision could be made for the spring 26 to be wound by the opening of the telephone.

Figure 8:
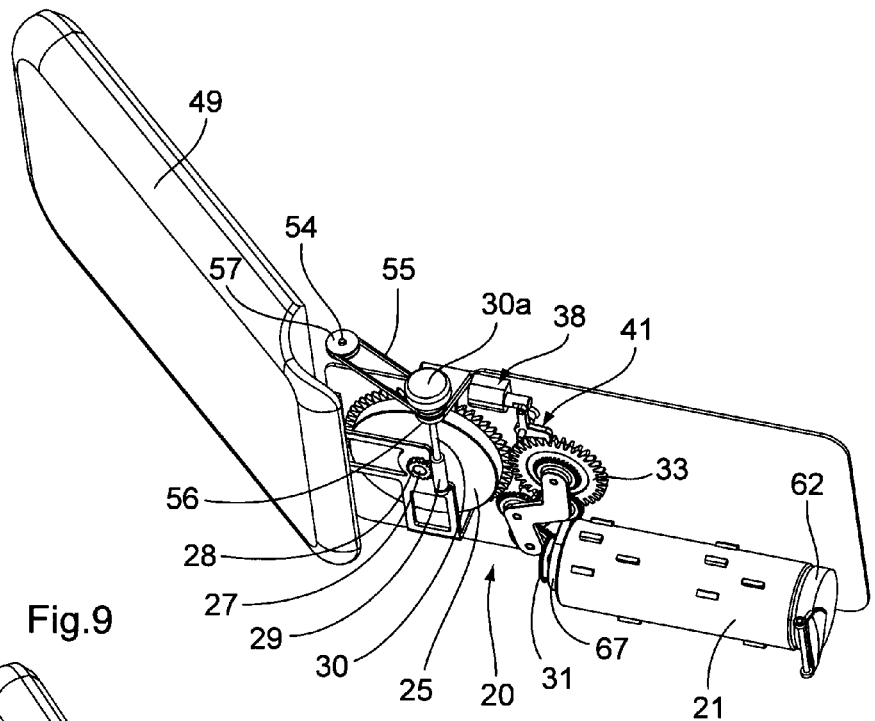
FIG. 8 is a Figure of the same type as FIG. 7, showing a variation of the winding mechanism.

Another example of the winding mechanism of the spring 26 which can be provided in the telephone in accordance with the second embodiment is shown in FIG. 8. In this example, the winding rod 30 is connected to the spindle 54 of the hinge 50 not by a gear train but by a belt 55 co-operating with pulleys 56, 57 fixedly attached respectively to the winding rod 30 and the hinge spindle 54.

In the case of a mobile telephone consisting of two mutually sliding parts, the part which does not have the ringing mechanism can comprise a rack which meshes directly, or indirectly via a gear train, with a pinion which is coaxial with and fixedly attached to the winding rod 30 to wind the spring 26 upon opening or closing the telephone.

As an alternative to the winding mechanisms described above, the mobile telephone in accordance with the second embodiment can comprise an automatic winding mechanism with an oscillating mass of the type provided in automatic mechanical watches, and which would use the movements of the mobile telephone to cause the barrel shaft 27 to rotate in the direction winding the spring 26.

As in the first embodiment, the ringing mechanism 20 can be used for various functions, i.e., in particular to inform the user of the reception of a telephone call or a message, to inform the user of a low battery charge, as an alarm clock ring or to remind the user about an event. In the first function, provision can be made that the processor 44 controls the stopping of the ringing of the mechanism 20 and the triggering of the traditional loud-speaker ringing after a predetermined amount of time if the user has still not accepted nor refused the call. This predetermined amount of time can be programmed by the user.

Figure 5:
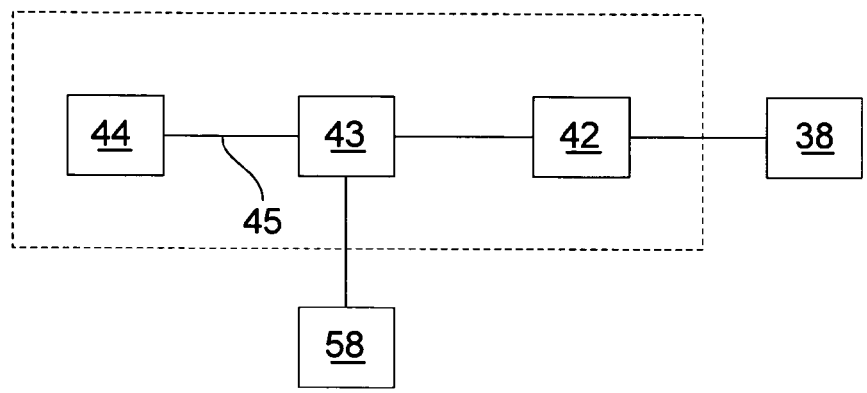
FIG. 5 is a block diagram showing in particular an electronic part controlling the ringing mechanism illustrated in FIG. 4.

Moreover, with reference to FIG. 5, a torque sensor 58 can be provided which determines if the tension of the spring 26 is sufficient to cause the ringing mechanism 20 to operate. If the spring 26 is not sufficiently wound, the microcontroller 43, which receives at one of its inputs the tension state measured by the torque sensor 58, does not activate the ringing mechanism 20 and imparts this information to the processor 44 which then controls the triggering of the traditional ringing.

Figure 9:
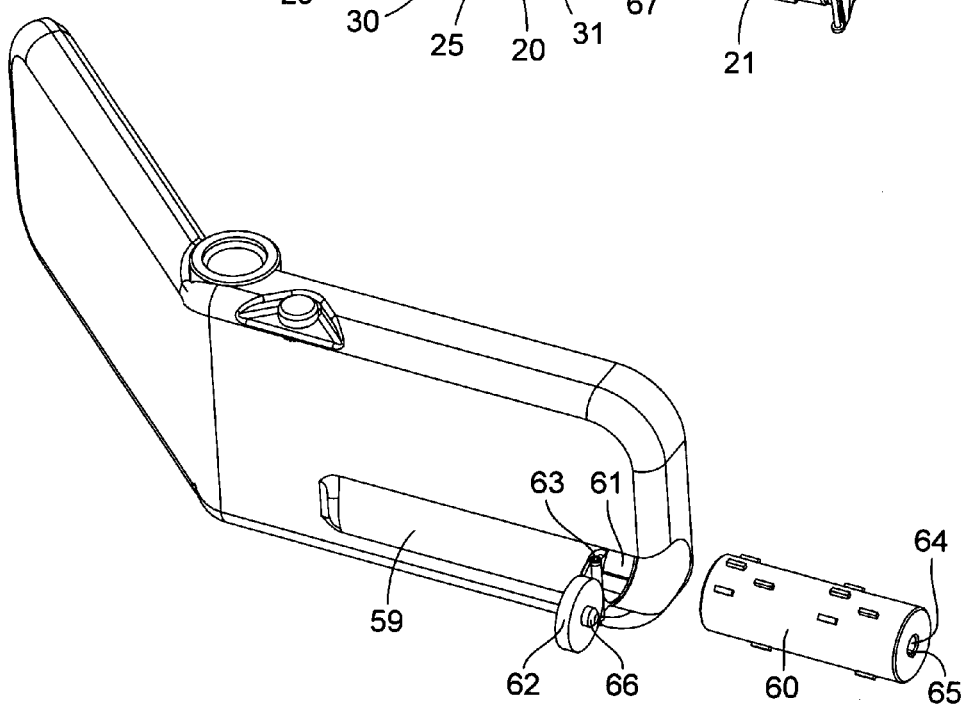
FIG. 9 is a perspective view of a mobile telephone in accordance with the first or second embodiment using an interchangeable rotating cylinder.

In accordance with an advantageous variation of the invention, the cylinder 7 of the first embodiment—or the cylinder 21 of the second embodiment—is interchangeable, i.e., the user can replace it with another cylinder whose protrusions are arranged in a different manner to produced a different melody. To this end, as shown in FIG. 9, the casing of the telephone defines a housing 59 for the cylinder, designated here by the reference numeral 60. The housing 59 can be accessed via an opening 61 formed in the casing. The opening 61 can be closed or opened by a mobile piece 62 articulated to the casing via a hinge 63. The cylinder 60 has a central longitudinal bore 64 and an inner longitudinal groove 65 which opens into the bore 64. At a first end of the cylinder 60, the bore 64 is intended to receive a drive spindle, i.e., the spindle of the motor 18 in the first embodiment and the spindle of the pinion 31 in the second embodiment. This drive spindle comprises a rib which co-operates with the groove 65 to render the cylinder 60 rotationally fixed to said spindle. At the second end of the cylinder 60, the bore 64 is intended to receive a support and guiding lug 66 protruding on the inner surface of the mobile piece 62 and aligned with the drive spindle. The cylinder 60 is held in its axial position at its first end by a flange 67 and at its second end by the piece 62 (cf. FIG. 7). The mobile piece 62 can be held in the closed position for example by a ball detent or by a screw.

In this mode of assembly, the cylinder 60 can easily be removed by the user who only has to open the piece 62 and slide the cylinder 60 axially out of its housing 59 through the opening 61. Placing another cylinder in the housing 59 is just as easy.

In alternatives of the first and second embodiments, the hammers 8, 22 can be omitted and the sounding elements 10, 23 can be in the form of vibrating strips actuated directly by the protrusions on the surface of the cylinder 7, 21.

Figure 10:
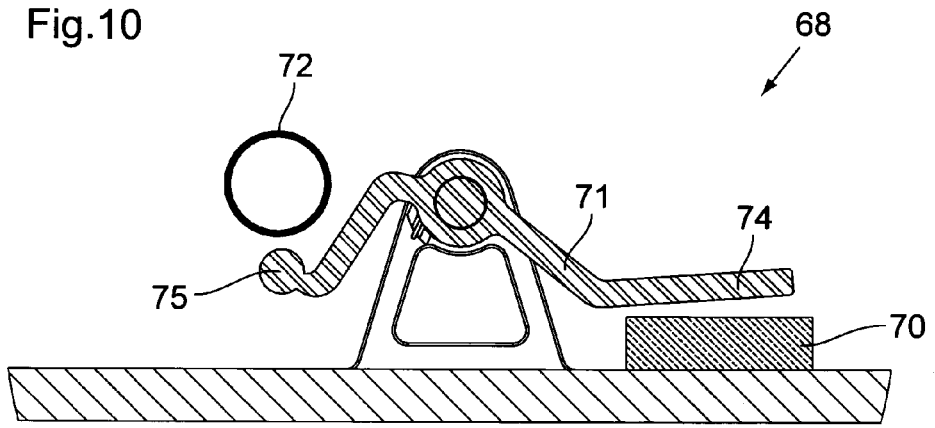
FIGS. 10 and 11 are sectional views of a ringing mechanism used in a mobile telephone in accordance with a third embodiment of the invention in two different positions.
Figure 11:
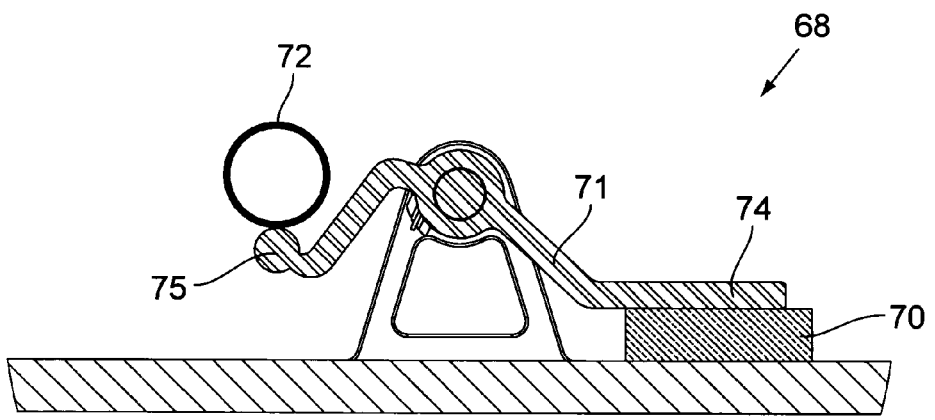
Figure 12:
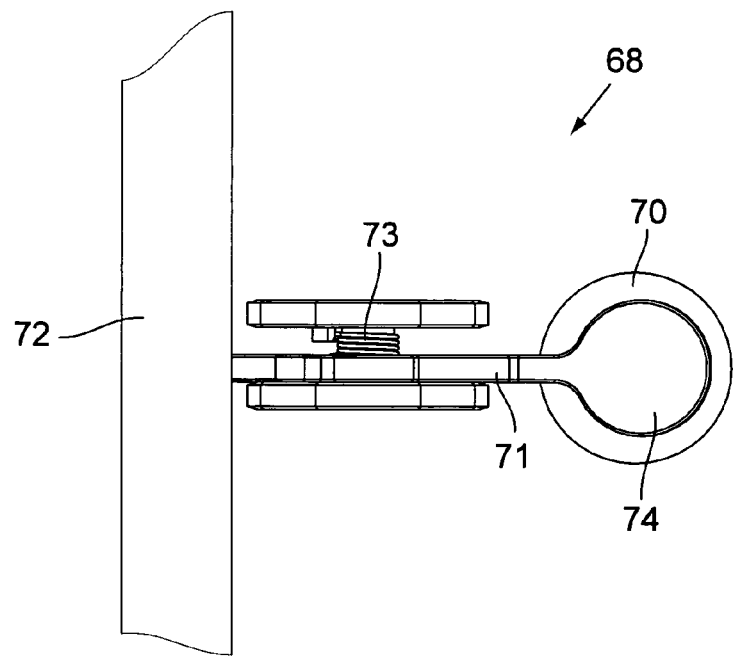
FIG. 12 is a top plan view of the mechanism shown in FIGS. 10 and 11.

A mobile telephone in accordance with a third embodiment of the invention comprises, in addition to a traditional loud-speaker ringing device, a ringing mechanism 68 as partially illustrated in FIGS. 10 to 13. This mechanism 68 comprises one or more sounding units each comprising an electromagnet 70, a pivoting hammer 71 and a sounding element 72 such as a tube, strip, bell or bent wire. The hammer 71 is subjected to the action of a spring 73 which, when the electromagnet 70 is not energised, keeps it in a neutral position where the ends of the hammer 71 do not contact the electromagnet 70 nor the sounding element 72 (FIG. 10). At least one end 74 of the hammer 71 is formed of a magnetisable material such as a ferrous material. When the electromagnet 70 is energised, it attracts the end 74 of the hammer 71 which causes it to pivot such that its other end 75 strikes the sounding element 72 (FIG. 11). In practice, the electromagnet 70 is controlled by electric pulses. At each pulse, the hammer 71 strikes the sounding element 72 and then immediately returns to its neutral position under the action of the spring 73 to allow the sounding element 72 to resonate. If the mechanism 68 has several sounding units with sounding elements 72 of different lengths, then melodies can be played by sending predetermined sequences of electric pulses to the electromagnets 70.

Figure 13:
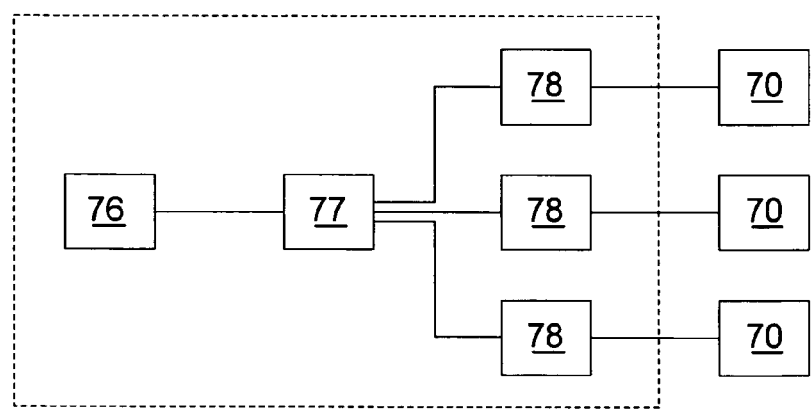
FIG. 13 is a block diagram showing in particular an electronic part controlling the ringing mechanism of the mobile telephone in accordance with the third embodiment of the invention.

FIG. 13 shows the electronic part for controlling the ringing mechanism 68. This electronic part comprises the main processor 76 of the telephone, a microcontroller 77 connected to the main processor 76 and amplification circuits 78 connected to respective outputs of the microcontroller 77. Each electromagnet 70 of the mechanism is connected to an output of a respective amplification circuit 78 and is thus controlled, via this amplification circuit 78, by the microcontroller 77.

This ringing mechanism 68 can be used for the same functions as those of the first and second embodiments.

The invention claimed is:

1. A mobile telephone comprising:
a ringing mechanism comprising
at least one sounding element,
at least one actuating member configured to come into mechanical contact with the at least one sounding element to cause the at least one sounding element to vibrate and thus produce a sound, and
a rotating member comprising protrusions on the surface thereof, the protrusions driving or forming the at least one actuating member; and
electronic means for controlling the ringing mechanism.

2. The mobile telephone as claimed in claim 1, wherein the ringing mechanism comprises a plurality of sounding elements configured to produce different respective musical notes and respective actuating members.

3. The mobile telephone as claimed in claim 1, wherein the ringing mechanism further comprises an electric motor controlled by the electronic means to rotationally drive the rotating member.

4. The mobile telephone as claimed in claim 1, wherein the ringing mechanism further comprises a mechanical motor with a spring to rotationally drive the rotating member and an electromechanical member controlled by the electronic means to blocking or allow the relaxation of the spring.

5. The mobile telephone as claimed in claim 4, wherein the mechanical motor comprises a barrel housing the spring and driving the rotating member via at least one gear, and the electromechanical member comprises a bistable electromagnet controlled by the electronic means, and a mechanical blocking element controlled by the bistable electromagnet and having a finger configured to be inserted between two consecutive teeth of a toothed arrangement of the barrel or of the at least one gear.

6. The mobile telephone as claimed in claim 5, further comprising a mechanism allowing the spring to be wound by an action constituting use of the mobile telephone.

7. The mobile telephone as claimed in claim 4, further comprising a mechanism allowing the spring to be wound by an action constituting use of the mobile telephone.

8. The mobile telephone as claimed in claim 7, wherein the mobile telephone comprises two parts which can move with respect to each other, the ringing mechanism being located in one of the two parts, and
said winding mechanism comprises a winding rod connected to the spring, and means for converting relative movement of the two parts into rotation of the winding rod.

9. The mobile telephone as claimed in claim 1, wherein the rotating member is configured to be replaceable by the user.

10. The mobile telephone as claimed in claim 9, wherein the rotating member is a cylinder mounted at one end on a drive spindle and supported at another end by a lug received in a bore of the cylinder, the lug being defined by a mobile piece configured to close a housing in which the cylinder is located.

11. The mobile telephone as claimed in claim 1, wherein the at least one actuating member is a hammer arranged to strike the corresponding sounding element.

12. The mobile telephone as claimed in claim 1, wherein the at least one sounding element is of one of the following types: tube, strip, bell, and wire.

13. The mobile telephone as claimed in claim 1, wherein the electronic control means comprise a main processor of the mobile telephone.

14. The mobile telephone as claimed in claim 1, wherein the ringing mechanism is visible through a glass of the mobile telephone.

15. A mobile telephone comprising:
a ringing mechanism comprising
at least one sounding element, and
at least one actuating member configured to come into mechanical contact with the at least one sounding element to cause the at least one sounding element to vibrate and thus produce a sound, the at least one actuating member being a hammer arranged to strike the corresponding sounding element; and
electronic means for controlling the ringing mechanism.

16. The mobile telephone as claimed in claim 1, wherein the ringing mechanism comprises one or more electromagnets controlled by the electronic means to respectively control the at least one actuating member by magnetic attraction.

17. A mobile telephone comprising:
a ringing mechanism comprising
a plurality of sounding elements to produce different respective musical notes,
a plurality of actuating members each configured to come into mechanical contact with respective sounding elements to cause the respective sounding elements to vibrate and thus produce a sound, and
one or more electromagnets; and
electronic means for controlling the ringing mechanism by controlling the one or more electromagnets to respectively control the actuating members by magnetic attraction.

* * * * *